(12) United States Patent
Fujikawa et al.

(10) Patent No.: US 12,249,725 B2
(45) Date of Patent: Mar. 11, 2025

(54) ALL-SOLID-STATE BATTERY

(71) Applicant: MAXELL, LTD., Kyoto (JP)

(72) Inventors: Katsuhiro Fujikawa, Otokuni-gun (JP); Takuma Morishita, Otokuni-gun (JP); Takumi Otsuka, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 484 days.

(21) Appl. No.: 17/634,007

(22) PCT Filed: Aug. 11, 2020

(86) PCT No.: PCT/JP2020/030619
§ 371 (c)(1),
(2) Date: Feb. 9, 2022

(87) PCT Pub. No.: WO2021/033601
PCT Pub. Date: Feb. 25, 2021

(65) Prior Publication Data
US 2022/0320645 A1    Oct. 6, 2022

(30) Foreign Application Priority Data
Aug. 20, 2019   (JP) .................................. 2019-150411

(51) Int. Cl.
*H01M 50/152*   (2021.01)
*H01M 4/62*   (2006.01)
(Continued)

(52) U.S. Cl.
CPC ......... *H01M 50/152* (2021.01); *H01M 4/625* (2013.01); *H01M 50/171* (2021.01); *H01M 10/0585* (2013.01)

(58) Field of Classification Search
CPC ............. H01M 4/663; H01M 10/0562; H01M 10/0585; H01M 50/109; H01M 50/14; H01M 50/167
See application file for complete search history.

(56) References Cited

U.S. PATENT DOCUMENTS

2002/0012625 A1*  1/2002  Watanabe .............. H01M 4/131
264/29.7

FOREIGN PATENT DOCUMENTS

JP       2005-228705 A    8/2005
JP        5804053 B2     11/2015
(Continued)

OTHER PUBLICATIONS

International Search Report dated Oct. 20, 2020, issued in counterpart International Application No. PCT/JP2020/030619 (2 pages).
(Continued)

*Primary Examiner* — Brittany L Raymond
(74) *Attorney, Agent, or Firm* — WHDA, LLP

(57) ABSTRACT

The all-solid-state battery 1 includes: an exterior can 2 with a bottom 21; a seal can 3 having a flat portion 31 and facing the exterior can 2; and a power generation element 4 contained between the exterior can 2 and seal can 3, where at least one of the inner surface of the bottom 21 of the exterior can 2 and the inner surface of the flat portion 31 of the seal can 3 includes a recess-protrusion structure. The battery includes a conductive sheet 5 located between that one of the inner surfaces which includes the recess-protrusion structure and the power generation element 4, the conductive sheet having an ability to recover against a pressing force. The rate of recovery of the conductive sheet 5 against a pressing force is not lower than 7%.

6 Claims, 4 Drawing Sheets

(51) Int. Cl.
*H01M 10/0585* (2010.01)
*H01M 50/171* (2021.01)

(56) References Cited

FOREIGN PATENT DOCUMENTS

JP  2017-152299   *  8/2017
JP  2017-152299 A    8/2017

OTHER PUBLICATIONS

Office Action dated May 8, 2022, issued in counterpart EP Application No. 20854996.4.
Office Action dated Aug. 5, 2022, issued in counterpart EP Application No. 20854996.4.

* cited by examiner

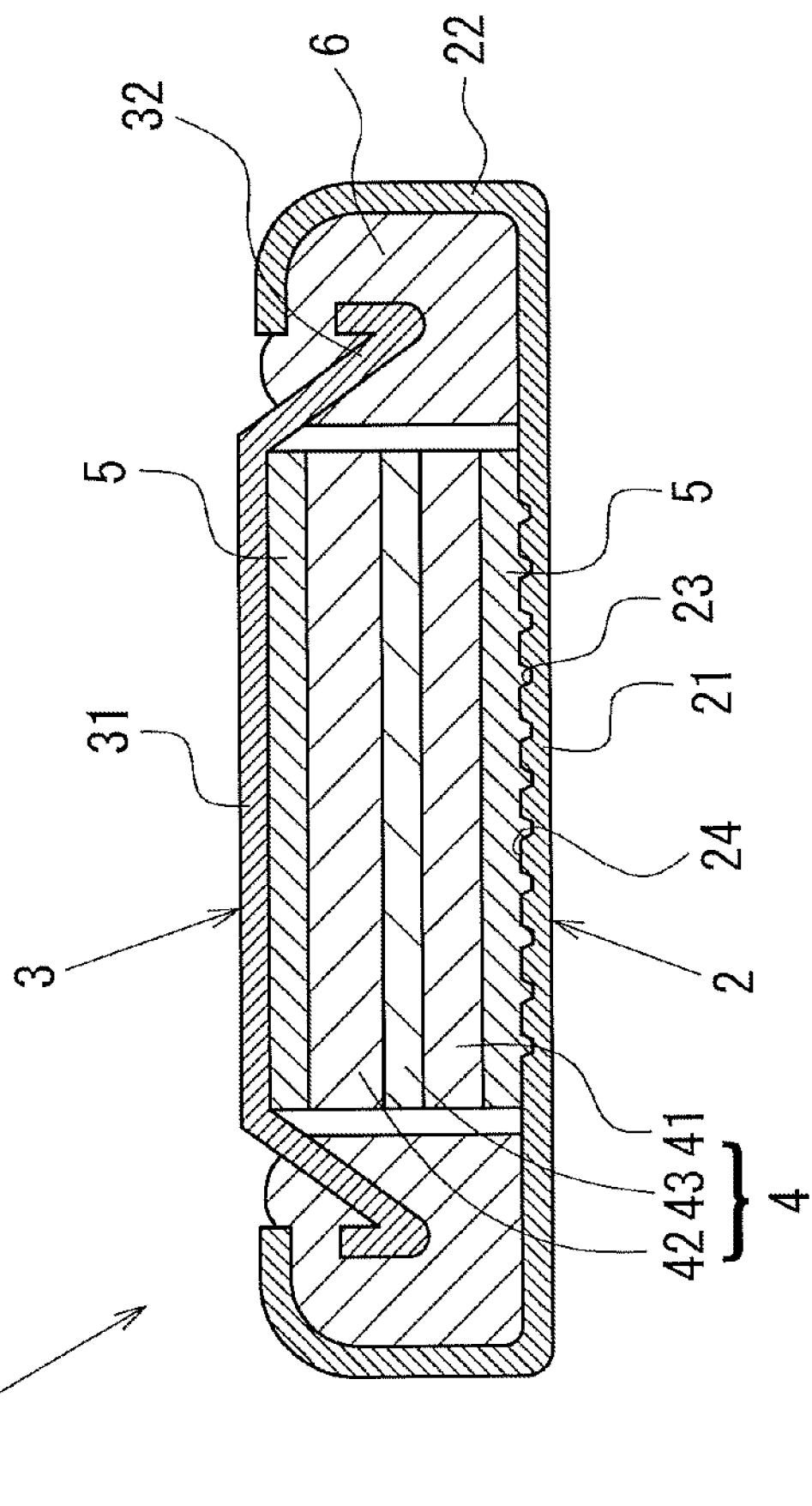

ALL-SOLID-STATE BATTERY

TECHNICAL FIELD

The present disclosure relates to an all-solid-state battery.

BACKGROUND ART

In conventional art, JP 2017-152299 A discloses a non-aqueous electrolyte battery in which the inner bottom surface of the positive-electrode can and the inner cap surface of the negative-electrode can are each provided with a recess-protrusion structure composed of flat portions and recessed portions (Patent Document 1). In this conventional nonaqueous electrolyte battery, providing this recess-protrusion structure allows portions of the positive or negative electrode to enter recesses. Thus, the conventional nonaqueous electrolyte battery increases the area of contact between the inner bottom surface of the positive-electrode can or the inner cap surface of the negative-electrode can, on one hand, and the electrode assembly, on the other, thereby reducing interior resistance to provide good discharge characteristics.

In this conventional nonaqueous electrolyte battery, the positive or negative electrode in contact with the recess-protrusion structure is not damaged by vibrations, impacts or the like during transportation, because the binder contained in the positive and negative electrodes fixes the active materials through bonding, and also because the separator located between the positive and negative electrodes absorbs vibrations, impacts or the like.

PRIOR ART DOCUMENTS

Patent Documents

[Patent Document 1] JP 2017-152299 A
[Patent Document 2] JP 2005-228705 A
[Patent Document 3] Japanese Patent No. 5804053

SUMMARY OF THE INVENTION

However, if an all-solid-state battery is provided with a recess-protrusion structure on the inner bottom surface of the positive-electrode can or the inner cap surface of the negative-electrode can, the positive or negative electrode in contact with the recess-protrusion structure may be damaged, because an all-solid-state battery has no separator between the positive and negative electrodes. Especially in the case of binderless positive and negative electrodes, damage to an electrode can easily occur. As such, in an all-solid-state battery with a recess-protrusion structure on the inner bottom surface of the positive-electrode can or the inner cap surface of the negative-electrode can, battery performance can significantly decrease, potentially making it impossible to maintain its performance.

In view of this, a problem to be solved by the present disclosure is to provide an all-solid-state battery that can maintain battery performance.

To solve the above-identified problem, the present disclosure provides the following arrangement: The all-solid-state battery according to the present disclosure includes: an exterior can with a bottom; a seal can having a flat portion and facing the exterior can; and a power generation element contained between the exterior can and the seal can, the power generation element including a cathode member, an anode member and a solid electrolyte layer located between the cathode member and the anode member, where at least one of an inner surface of the bottom of the exterior can and an inner surface of the flat portion of the seal can may include a recess-protrusion structure. The battery may include a conductive sheet located between the at least one inner surface including the recess-protrusion structure and the power generation element, the conductive sheet having an ability to recover against a pressing force. A rate of recovery of the conductive sheet against a pressing force may be not lower than 7%.

The all solid-state battery according to the present disclosure can maintain battery performance.

BRIEF DESCRIPTION OF THE DRAWINGS

FIG. 4 is a cross-sectional view of an all-solid-state battery according to another embodiment, illustrating its structure.

EMBODIMENTS FOR CARRYING OUT THE INVENTION

Figure 1:
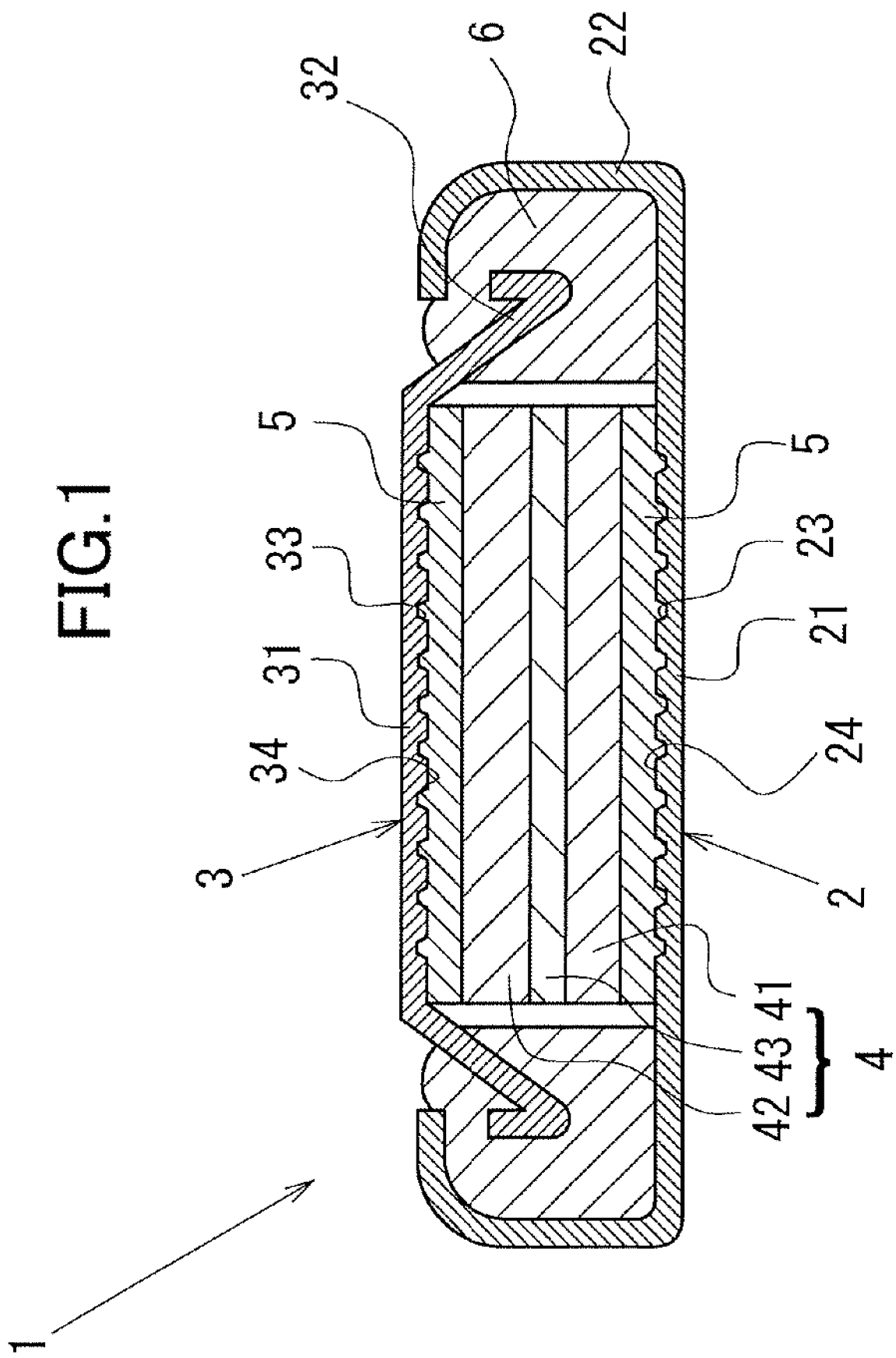
FIG. 1 is a cross-sectional view of an all-solid-state battery according to an embodiment, illustrating its structure.

The all-solid-state battery according to an embodiment includes: an exterior can with a bottom; a seal can having a flat portion and facing the exterior can; and a power generation element contained between the exterior can and the seal can, the power generation element including a cathode member, an anode member and a solid electrolyte layer located between the cathode member and the anode member, where at least one of an inner surface of the bottom of the exterior can and an inner surface of the flat portion of the seal can may include a recess-protrusion structure. The battery may include a conductive sheet located between the at least one inner surface including the recess-protrusion structure and the power generation element, the conductive sheet having an ability to recover against a pressing force. A rate of recovery of the conductive sheet against a pressing force may be not lower than 7%.

As used herein, rate of recovery is defined by the expression indicated below, where t1 is the thickness of the conductive sheet, t2 is the thickness of the conductive sheet as compressed by a predetermined pressing force, and t3 is the thickness of the conductive sheet as found when the pressing force has been removed. Further, a conductive sheet is deemed to be able to recover if its rate of recovery is equal to or higher than a predetermined level.

$$(t3-t2)/(t1-t2)\times 100(\%)$$

Rate of recovery can be measured by the method described in the Japanese Industry Standards (JIS), R3453 2001 (joint sheets).

The conductive sheet may be a graphite sheet.

Since a conductive sheet, such as a graphite sheet or conductive tape, is provided between that one of the inner surface of the bottom of the exterior can and the inner surface of the flat portion of the seal can which includes a recess-protrusion structure, on one hand, and the power generation element, on the other, this will prevent the power generation element from contacting the recess-protrusion structure and being damaged.

The conductive sheet, able to recover against a pressing force, has good flexibility as well as good conductivity. Thus, the conductive sheet can function as a current collector and, at the same time, absorb expansion and contraction resulting from charging and discharging of the power generation element or a pressing force during crimping of the exterior can over the seal can. Thus, the all-solid-state battery can reduce a decrease in battery performance resulting from damage to the power generation element or formation of a gap.

Further, the conductive sheet has an appropriate ability to recover, i.e., a rate of recovery not lower than 7%, against expansion of the power generation element due to charging or compression due to a pressing force during crimping of the exterior can over the seal can. Thus, in the all-solid-state battery, the conductive sheet presses the power generation element to an appropriate degree, thereby maintaining good conductivity between the inner surface of the bottom of the exterior can and the power generation element and/or maintaining good conductivity between the inner surface of the flat portion of the seal can and the power generation element, thus maintaining the battery's performance.

Because of the recess-protrusion structure formed on at least one of the inner surface of the bottom of the exterior can and the inner surface of the flat portion, the conductive sheet has an increased area of contact with the at least one inner surface having the recess-protrusion structure, i.e., an increased current collection area. This allows the all-solid-state battery to yet better maintain battery performance.

If the conductive sheet is a graphite sheet, the graphite sheet may preferably have an apparent density of 0.3 to 1.5 g/cms. This takes account of the fact that an excessively low apparent density reduces the conductivity of the graphite sheet and an excessively high apparent density reduces flexibility.

Preferably, the conductive sheet may have a thickness of 0.05 to 0.5 mm. This takes account of the fact that an excessively small thickness results in an insufficient ability of the conductive sheet to recover against compression, and an excessively large thickness means that the conductive sheet will occupy a significant portion of the interior space of the all-solid-state battery, necessitating a reduced capacity of the power generation element.

Embodiment 1

Now, an embodiment of the present disclosure with a conductive sheet constituted by a graphite sheet, Embodiment 1, will be specifically described with reference to FIG. 1. First, as shown in FIG. 1, an all-solid-state battery 1 generally includes an exterior can 2, a seal can 3, a power generation element 4, a graphite sheet 5 located between the exterior can 2 and power generation element 4, and another graphite sheet 5 located between the seal can 3 and power generation element 4. In the present embodiment, the all-solid-state battery 1 is a flat battery. In other implementations, the conductive sheet may be a conductive tape.

The exterior can 2 includes a circular bottom 21 and a cylindrical side wall 22 that extends contiguously from the periphery of the bottom 21 and is cylindrical in shape. As viewed in a longitudinal cross section, the cylindrical side wall 22 extends generally perpendicularly to the bottom 21. The exterior can 2 is formed from a metallic material, such as stainless steel.

Figure 2:
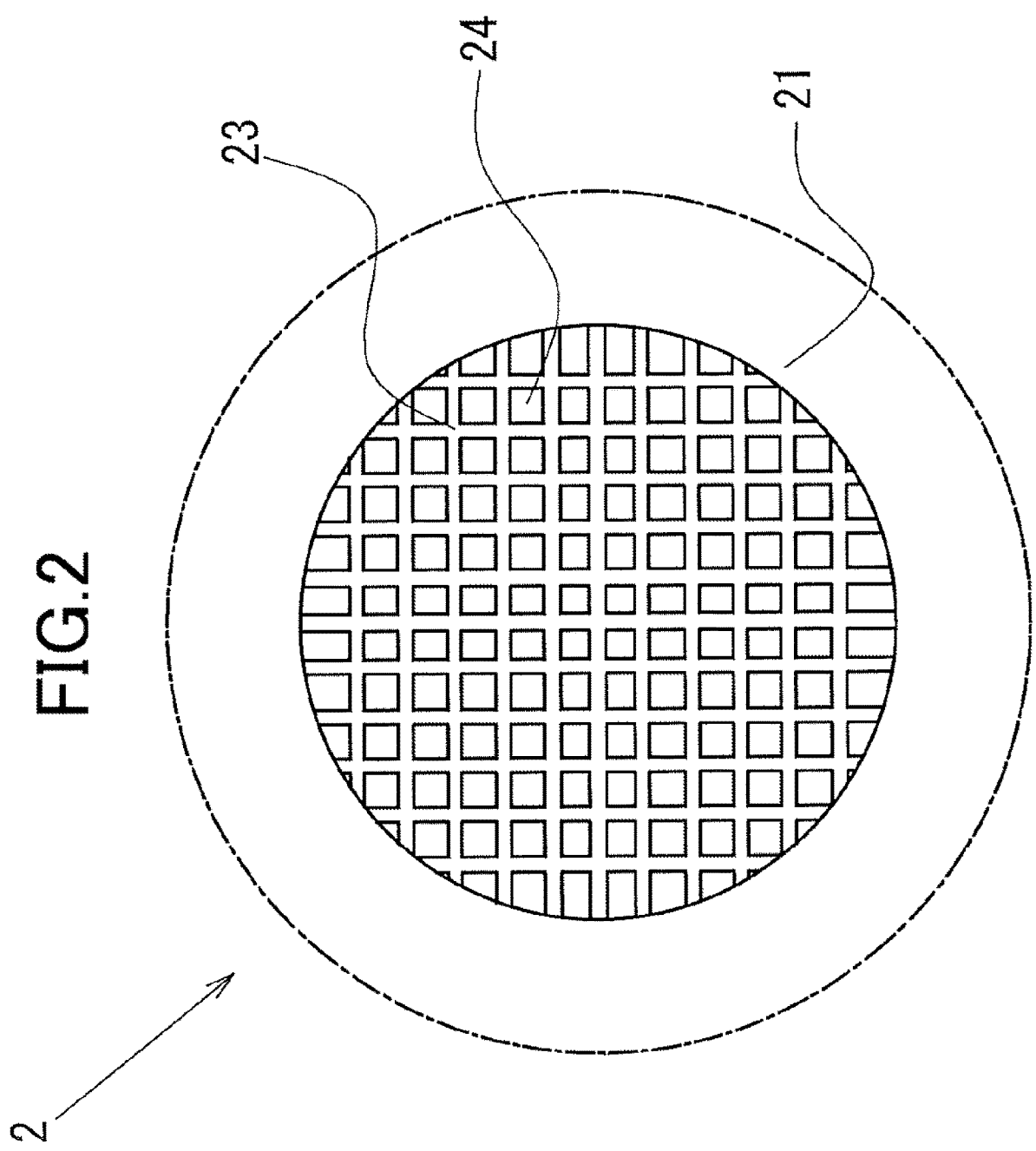
FIG. 2 is a plan view of the exterior can of the embodiment, illustrating its structure.

The inner surface of the bottom 21 of the exterior can 2 has a recess-protrusion structure. Recesses 23 are formed on the inner surface of the bottom 21 by knurling. The recesses 23 are located in the area of the inner surface of the bottom 21 that faces the lower surface of the power generation element 4. FIG. 2 is a plan view of the inner surface of the bottom 21 of the exterior can 2, illustrating its structure. As shown in FIG. 2, the recesses are generally shaped as a grid, including a plurality of grooves extending vertically as viewed in the drawing and uniformly spaced apart from each other and a plurality of grooves extending horizontally as viewed in the drawing and uniformly spaced apart from each other. Protrusions 24 are provided adjacent to the recesses 23. As the recess-protrusion structure is arranged in this manner, the graphite sheet 5, discussed further below, has an increased area of contact with the inner surface of the bottom 21, i.e., current collection area. It will be understood that the recesses 23 are not limited to an arrangement that is generally grid-shaped as viewed in a plan view. For example, as viewed in a plan view, the recesses 23 may be shaped as vertical stripes extending vertically and parallel to each other, or may be shaped as polka dots, where a plurality of circular or ring-shaped recesses 23 are arranged in a balanced manner, for example. Conversely, a plurality of circular or ring-shaped protrusions 24 may be arranged in a balanced manner to form polka dots, for example. Further, the recess-protrusion structure includes implementations in which recesses 23 are provided only in a limited area of the bottom 21, and implementations in which protrusions 24 are provided only in a limited area of the bottom 21. Since the inner surface of the bottom 21 of the exterior can 2 has a recess-protrusion structure, there is higher friction between the bottom 21 of the exterior can 2 and the graphite sheet 5 (see FIG. 1). This prevents positional displacement of the graphite sheet 5 upon receiving vibration or impact.

Figure 3:
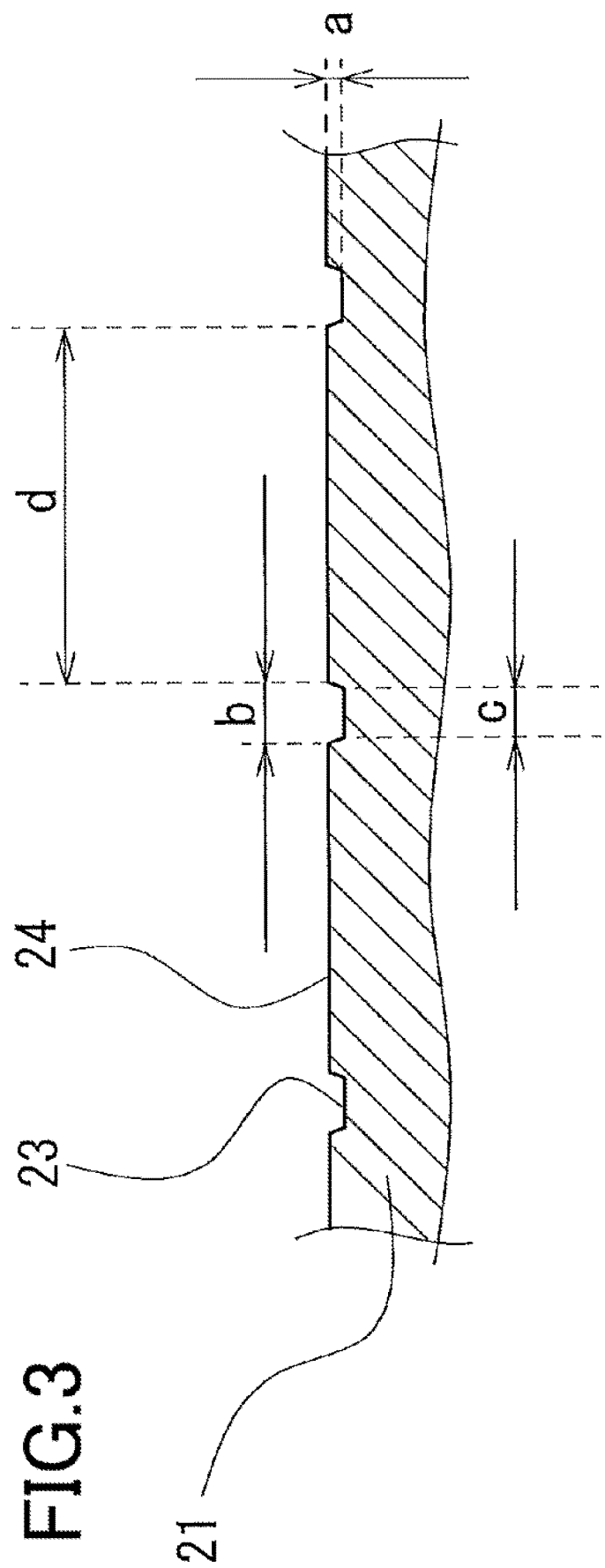
FIG. 3 is a cross-sectional view of recesses in the exterior can of the embodiment, illustrating its structure.

As shown in FIG. 3, a recess 23 has a depth a of 0.01 mm, an opening width b of 0.06 mm, and a bottom width c of 0.05 mm. A protrusion 24 has a width d of 0.49 mm.

The depth a of the recess 23 is preferably not smaller than 0.005 mm, and more preferably not smaller than 0.007 mm; the depth a is preferably not larger than 0.02 mm, and more preferably not larger than 0.015 mm. The opening width b of the recess 23 is preferably not smaller than 0.03 mm, and more preferably not smaller than 0.04 mm; the width b is preferably not larger than 0.09 mm, and more preferably not larger than 0.08 mm. The bottom width c of the recess 23 is preferably not smaller than 0.02 mm, and more preferably not smaller than 0.03 mm; the width c is preferably not larger than 0.08 mm, and more preferably not larger than 0.07 mm. The width d of the protrusion 24 is preferably not smaller than 0.30 mm, and more preferably not smaller than 0.35 mm; the width d is preferably not larger than 0.70 mm, and more preferably not larger than 0.65 mm.

As the recess-protrusion structure is constructed in this manner, the graphite sheet 5 can easily contact the inner surface of the bottom 21 of the exterior can 2. That is, if the depth a of the recesses 23 is too large, the graphite sheet 5 cannot easily contact the recesses 23; if the depth a is too small, the area of contact with the graphite sheet decreases. Further, if the opening width b of the recesses 23 is too small, the graphite sheet 5 cannot easily enter recesses 23; if the opening width b is too large, this means a small width d for the protrusions 24. If the width d of the protrusions 24 is small, the manner in which the upper surfaces of the protrusions 24 receive the graphite sheet 5 is less surface-based. For example, if the recesses 23 are to be provided as a grid as described above, then, the smaller the width d of a protrusion 24, the narrower the protrusion top i.e. the smaller the upper surface of the rectangle as viewed in a plan view. Since the graphite sheet 5 is pressed by the power generation element 4 toward the bottom 21 of the exterior can 2, the sheet may be damaged by contact with protrusions. In view of this, the width d of the protrusions 24 is suitably larger than the opening width b of the recesses 23. In other words, the graphite sheet 5 suitably contacts the upper surfaces of protrusions 24 that are relatively wide. Thus, the depth a and opening width c of the recesses 23 and the width d of the protrusions 24 are preferably decided to strike the right balance. The bottom width c of the recesses 23 are suitably smaller than the opening width b to facilitate contact with the graphite sheet 5.

The seal can 3 includes a circular flat portion 31 and a cylindrical peripheral wall 32 extending contiguously from the periphery of the flat portion 31. The opening of the seal can 3 faces the opening of the exterior can 2. The seal can 3 is formed from a metallic material such as stainless steel.

The inner surface of the flat portion 31 of the seal can 3 is also provided with a recess-protrusion structure. The recesses 33 and protrusions 34 have the same constructions as the above-discussed recesses 23 and protrusions 24 of the exterior can 2, and thus their description will be omitted. Further, as the inner surface of the flat portion 31 of the seal can 3 has a recess-protrusion structure, there is higher friction between the flat portion 31 of the seal can 3 and the graphite sheet 5 (see FIG. 1). This prevents positional displacement of the graphite sheet 5 of the all-solid-state battery 1 upon receiving vibration or impact.

After the power generation element 4 and graphite sheets 5 are placed within the interior space of the exterior can 2 and seal can 3, a gasket 6 is placed between the cylindrical side wall 22 of the exterior can 2 and the peripheral wall 32 of the seal can 3 before crimping. Specifically the openings of the exterior can 2 and seal can 3 are positioned so as to face each other and the peripheral wall 32 of the seal can 3 is inserted into the cylindrical side wall 22 of the exterior can 2; then, a gasket 6 is placed between the cylindrical side wall 22 and peripheral wall 32 and the seal can 3 is crimped over the exterior can 3. Thus, the interior space defined by the exterior can 2 and seal can 3 is closed up tightly. It will be understood that the constructions of the exterior can 2, seal can 3 and gasket 6 are similar to those for well-known flat batteries, and are not limited to any particular material or shape or any other feature.

The power generation element 4 includes a cathode member 41, an anode member 42, and a solid electrolyte layer 43. The solid electrolyte layer 43 is located between the cathode and anode members 41 and 42. In the power generation element 4 are stacked, in the direction away from the bottom 21 of the exterior can 2 (i.e., away from the bottom in the drawing): the cathode member 41, solid electrolyte layer 43 and anode member 42. The power generation element 4 is shaped as a circular column. The power generation element 4 is positioned adjacent to the inner surface of the bottom 21 of the exterior can 2, with the graphite sheet 5 positioned in between. Thus, the exterior can 2 functions as a positive-electrode can. Further, the power generation element 4 is in contact with the inner surface of the flat portion 31 of the seal can 3, with the graphite sheet 5 positioned in between. Thus, the seal can 3 functions as a negative-electrode can. It will be understood that the shape of the power generation element 4 is not limited to a circular column, and may be modified in various ways depending on the shape of the all-solid-state battery 1: for example, the element may be shaped as a rectangular parallelepiped or a prism.

The cathode member 41 is made of a cathode active material that is used for lithium ion secondary batteries, constituted by 180 mg of a cathode mixture of $LiNi_{0.6}Co_{0.2}Mn_{0.2}O_2$ particles of an average diameter of 3 µm, a sulfide solid electrolyte ($Li_6PS_5Cl$), and carbon nanotubes serving as a conductive aid in a mass ratio of 55:40:5, which has been formed in a mold with a diameter of 10 mm to be a columnar cathode pellet. It will be understood that the cathode member 41 can be made of any material that can function as a cathode member for the power generation element 4, and may be made of, for example, lithium cobalt oxide, lithium nickel oxide, lithium manganese oxide, a lithium-nickel-cobalt-manganese composite oxide, an olivine-type composite oxide or the like, or an appropriate mixture thereof. It will also be understood that the size and shape of the cathode member 41 are not limited to such a circular column, and may be modified in various ways depending on the size and shape of the all-solid-state battery 1.

The anode member 42 is made of an anode active material that is used for lithium ion secondary batteries, constituted by 300 mg of an anode mixture of LTO ($Li_4Ti_5O_{12}$; lithium titanate), a sulfide solid electrolyte ($Li_6PS_5Cl$), and carbon nanotubes in a weight ratio of 50:45:5, which has been formed to be a columnar anode pellet. It will be understood that the anode member 42 can be made of any material that can function as an anode member for the power generation element 4, and may be made of, for example, metallic lithium, a lithium alloy, a carbon material such as graphite or carbon with low crystallinity, SiO, or LTO ($Li_4Ti_5O_{12}$; lithium titanate), or an appropriate mixture thereof. It will also be understood that the size and shape of the anode member 42 are not limited to such a circular column, and may be modified in various ways depending on the size and shape of the all-solid-state battery 1.

The solid electrolyte layer 43 is made of a sulfide solid electrolyte ($Li_6PS_5Cl$) formed to be a column. Alternatively although not limiting, the solid electrolyte layer 43 may be made of other sulfur-based solid electrolytes, such as argyrodite ones, to provide ion conductivity. If a sulfur-based solid electrolyte is used, the surface of the cathode active material is preferably covered with niobium oxide to prevent reaction with cathode active material. Further, the solid electrolyte layer 43 may be made of a hydride-based solid electrolyte or an oxide-based solid electrolyte, for example. It will also be understood that the size and shape of the solid electrolyte layer 43 is not limited to such a circular column, and may be modified in various ways depending on the size and shape of the all-solid-state battery 1.

One graphite sheet 5 is provided between the bottom 21 of the exterior can 2 and the cathode member 41 of the power generation element 4, and another one between the flat portion 31 of the seal can 3 and the anode member 42 of the power generation element 4. That is, as shown in FIG. 1, if both the inner surface of the bottom 21 of the exterior can 2 and the inner surface of the flat portion 33 of the seal can 3 are provided with a recess-protrusion structure, each of the upper and lower surfaces of the power generation element 4 is provided with a graphite sheet 5 (i.e., conductive sheet). Each graphite sheet 5 is formed by rolling expanded graphite. The shape of the graphite sheet 5 as viewed in a plan view is generally analogous to the shape of the interior space of the all-solid-state battery 1 as viewed in a plan view. Thus, the graphite sheet 5 is generally circular in shape as viewed in a plan view. The area of the upper surface of that graphite sheet 5 which is adjacent to the exterior can 2 may be equal to the area of the lower surface of the cathode member 41 of the power generation element 4, or may be larger than the area of the lower surface of the cathode member 41 of the power generation element 4. The area of the lower surface of that graphite sheet 5 which is adjacent to the seal can 3 may be equal to the area of the upper surface of the anode member 42 of the power generation element 4, or may be larger than the area of the upper surface of the anode 42 of the power generation element 4. That is, it suffices if the upper surface of the graphite sheet 5 adjacent of the exterior can 2 covers the lower surface of the cathode member 41. It suffices if the lower surface of the graphite sheet 5 adjacent to the seal can 3 covers the upper surface of the anode member 42. It will also be understood that the graphite sheets 5 are not limited to a generally circular shape as viewed in a plan view, and their shape may be modified in various ways depending on the shape of the all-solid-state battery 1 as viewed in a plan view: for example, the sheets may be elliptical or generally polygonal in shape as viewed in a plan view.

More specifically, a graphite sheet 5 is manufactured in the following manner: First, acidifying graphite particles, which have been prepared by acidifying natural graphite, are heated. This causes acids between the layers of the acidified graphite to vaporize and foam the graphite, causing it to expand. This expanded graphite is formed into felt and then rolled by a rolling mill to form a sheet. A disk cut out of this sheet of expanded graphite serves as a graphite sheet 5. As discussed above, the expanded graphite is formed by acids vaporizing and foaming the acidified graphite. Thus, the graphite sheet 5 is porous. As such, the graphite sheet 5 has good flexibility due to its porosity, in addition to the conductivity intrinsic to graphite. Manufacture of the graphite sheet 5 is not limited to this method, and the graphite sheet 5 may be manufactured with any method.

The apparent density of the graphite sheets 5 is preferably not lower than 0.3 $g/cm^3$, and more preferably not lower than 0.7 $g/cm^3$; the apparent density is preferably not higher than 1.5 $g/cm^3$, and more preferably not higher than 1.3 $g/cm^3$. This takes account of the fact that an excessively low apparent density of a graphite sheet 5 means that the graphite sheet 5 can easily be damaged, and an excessively high apparent density reduces flexibility.

The thickness of the graphite sheets 5 (i.e., conductive sheets) is preferably not smaller than 0.05 mm, and more preferably not smaller than 0.07 mm; the thickness is preferably not larger than 0.5 mm, and more preferably not larger than 0.2 mm. This takes account of the fact that an excessively small thickness of a graphite sheet 5 means an insufficient ability to recover against compression of the graphite sheet 5, and an excessively large thickness means that the graphite sheet 5 will occupy a significant portion of the interior space of the all-solid-state battery 1, necessitating a reduced capacity of the power generation element 4.

The rate of recovery of the graphite sheets 5 (i.e., conductive sheets) obtained from the above-indicated expression is suitably not lower than 7%. If the graphite sheets 5 (i.e., conductive sheets) have such an appropriate ability to recover, each graphite sheet 5 (i.e., conductive sheet) presses the power generation element 4 to an appropriate degree. This will enable maintaining good conductivity between the inner surface of the bottom 21 of the exterior can 2 and the power generation element 4 and maintaining good conductivity between the inner surface of the flat portion 31 of the seal can 3 and the power generation element 4. The rate of recovery is more preferably not lower than 10% to maintain good conductivity.

Thus, the apparent density or thickness of the graphite sheets 5 is preferably decided to strike the right balance, based on flexibility, ability to recover and effective use of the interior space.

As discussed above, the graphite sheets 5 have good conductivity and flexibility. Thus, each graphite sheet 5 can function as a current collector and, at the same time, absorb expansion and contraction due to charging and discharging of the power generation element 4 or a pressing force during crimping of the exterior can 2 over the seal can 3. Thus, the all-solid-state battery 1 can reduce a decrease in battery performance resulting from damage to the power generation element 4 or formation of a gap.

Further, as discussed above, each graphite sheet 5, which is flexible, has an appropriate ability to recover against expansion due to charging of the power generation element, or compression due to a pressing force during crimping of the exterior can 2 over the seal can 3. This will enable the all-solid-state battery 1 to maintain good conductivity between the inner surface of the bottom 21 of the exterior can 2 and the power generation element 4, and maintain good conductivity between the inner surface of the flat portion 31 of the seal can 3 and the power generation element 4, thereby maintaining the battery's performance.

Further, because of the recess-protrusion structure formed on the inner surface of the bottom 21 and the recess-protrusion structure formed on the flat portion 31, each conductive sheet 5 has an increased area of contact with the associated one of the bottom 21 and flat portion 31, i.e., current collection area. This will enable the all-solid-state battery 1 to yet better maintain battery performance.

(Variations)

As shown in FIG. 4, only the inner surface of the bottom 21 of the exterior can 2 may be provided with a recess-protrusion structure, and the inner surface of the flat portion 31 of the seal can 3 may be flat.

Alternatively, although not shown, only the inner surface of the flat portion 31 of the seal can 3 may be provided with a recess-protrusion structure, and the inner surface of the bottom 21 of the exterior can 2 may be flat. Such implementations will also produce the above-identified effects. Although in FIG. 4 a graphite sheet 5 is located adjacent to the inner surface of a seal can 3 that has no recess-protrusion structure, the graphite sheet 5 may be omitted and the power generation element 4 may be in direct contact with the inner surface of the flat portion 31 of the seal can 3. In such implementations, too, the graphite sheet 5 presses the power generation element 4 to maintain good conductivity between the inner surface of the flat portion 31 of the seal can 3 and the power generation element 4.

Although embodiments have been described, the present disclosure is not limited to the above-described embodiments, and various modifications are possible without departing from the spirit thereof.

EXAMPLES

Examples of the all-solid-state battery 1 according to the present disclosure will now be described.

Inventive Example

<Fabrication of Cathode Member>

$LiNi_{0.6}Co_{0.2}Mn_{0.2}O_2$ particles of an average diameter of 3 μm, a sulfide solid electrolyte ($Li_6PS_5Cl$), and carbon nanotubes ("VGCF" (trade name) from Showadenkosya.co.ltd.), to serve as a conductive aid, were mixed in a mass ratio of 55:40:5, and were thoroughly kneaded to prepare a cathode mixture. Then, 90 mg of the cathode mixture was put into a powder molding die with a diameter of 10 mm, and pressure formed by a press under a condition of 10 t/cm$^2$ to fabricate a cathode-mixture molding, which constituted a cathode member 41.

<Formation of Solid Electrolyte Layer>

Next, 45 mg of a sulfide solid electrolyte (Li$_6$PS$_5$Cl) was put on top of the cathode member 41 still within the powder molding die, and pressure formed by a press to form a solid electrolyte layer 43 on the cathode member 41.

<Fabrication of Anode Member>

Lithium titanate particles of an average diameter of 35 μm, a sulfide solid electrolyte (Li$_6$PS$_6$Cl), and graphite powder to serve as a conductive aid were mixed in a mass ratio of 50:40:5, and were thoroughly kneaded to prepare an anode mixture. Then, 150 mg of the anode mixture was put on top of the solid electrolyte layer 43 still within the powder molding die, and pressure formed by a press to form an anode-mixture molding on the solid electrolyte layer 43, which constituted an anode member 42. A power generation element 4 composed of the cathode member 41, solid electrolyte layer 43 and anode member 42 stacked on top of each other was fabricated in this way.

<Assembly of Battery>

An exterior can 2 and a seal can 3, both made of stainless steel, were prepared that were together to serve as a metal container for containing the power generation element 4. As shown in FIGS. 1 to 3, recess-protrusion structures (recesses 23, 33 and protrusions 24, 34) were formed on the inner surface of the bottom 21 of the exterior can 2 and the inner surface of the flat portion 31 of the seal can 3 by knurling.

Next, two flexible graphite sheets 5 were prepared. Each graphite sheet 5 had a thickness of 0.1 mm, an apparent density of 1.0 g/cm$^3$ and a rate of recovery of 15%, and was a circular cutout with a diameter of 10 mm. Each graphite sheet 5 was used as a current collector.

A gasket 6 made of polyphenylene sulfide was mounted on the seal can 3 and, with the opening of the seal can 3 facing upward (i.e., the flat portion 31 located lower), one of the two graphite sheets 5 was placed on the inner surface of the flat portion 31 of the seal can 3, and the power generation element 4 was overlaid on top thereof such that the anode member 42 faces the graphite sheet 5. Thereafter, the other graphite sheet 5 was mounted on the side of the power generation element 4 adjacent to the cathode member 41. The exterior can 2 was then placed thereon to cover it and the exterior can 2 was crimped over the seal can 3 to provide a seal, resulting in a coin-shaped all-solid-state battery 1.

Comparative Example 1

An all-solid-state battery of Comparative Example 1 had a basic construction similar to that of the all-solid-state battery 1 of the Inventive Example, and was different in that the graphite sheets 5 were replaced by a nonwoven fabric made of carbon fiber to be used as a current collector. The nonwoven fabric of carbon fiber had a thickness of 0.2 mm and a rate of recovery of 4%.

Comparative Example 2

An all-solid-state battery of Comparative Example 2 had a basic construction similar to that of the all-solid-state battery 1 described in the Examples, and was different in that the inner surface of the bottom of the exterior can and the inner surface of the flat portion of the seal can had no recess-protrusion structure created by knurling.

<Comparison Testing>

The all-solid-state battery 1 of the Inventive Example, the all-solid-state battery of Comparative Example 1 and the all-solid-state battery of Comparative Example 2 were tested under the following conditions, and their capacity retention rates were calculated and compared.

Each of these all-solid-state batteries was charged with a constant current of 0.2 C until the voltage of 3.1 V was reached; then, it was charged with a constant voltage of 3.1 V until the current of 0.02 C was reached; thereafter, it was discharged with a constant current of 0.2 C until the voltage of 1.2 V was reached. This charge/discharge cycle was repeated 300 times, and the ratio of the discharge capacity for the 300th cycle to the discharge capacity for the second cycle (i.e., capacity retention rate) was calculated.

The results show that the all-solid-state battery 1 of the Inventive Example had a capacity retention rate of 98%, which means that, even at the 300th cycle, it maintained substantially the same discharge capacity as directly after the initiation of charge/discharge cycles. The all-solid-state battery of Comparative Example 1 had a capacity retention rate of 72%, showing that, at the 300th cycle, the discharge capacity had decreased by as much as about 30% from that directly after the initiation of charge/discharge cycles.

This shows that the all-solid-state battery 1 of the Inventive Example had an appropriate ability to recover by virtue of the flexible graphite sheets 5 serving as current collectors and thus was capable of better maintaining battery performance than the all-solid-state battery of Comparative Example 1, i.e., all-solid-state battery using a nonwoven fabric of carbon fiber.

The all-solid-state battery of Comparative Example 2 had a capacity retention rate of 90%, which means that the capacity retention rate had decreased somewhat more than that of the Inventive Example. This shows that the all-solid-state battery 1 of the Inventive Example better maintained battery performance by virtue of the increased current collection area created by the recess-protrusion structures on the inner surface of the bottom 21 of the exterior can 2 and the inner surface of the flat portion 31 of the seal can 3 (recesses 23, 33 and protrusions 24, 34).

EXPLANATION OF CHARACTERS

1: all-solid-state battery
2: exterior can, 21: bottom, 22: cylindrical side wall, 23: recesses, 24: protrusions
3: seal can, 31: flat portion, 32: peripheral wall, 33 recesses, 34: protrusions
4: power generation element, 41: cathode member, 42: anode member, 43: solid electrolyte layer
5: graphite sheets (conductive sheets)
6: gasket

The invention claimed is:
1. A all-solid-state battery comprising:
an exterior can with a bottom;
a seal can having a flat portion and facing the exterior can; and
a power generation element contained between the exterior can and the seal can, the power generation element including a cathode member, an anode member and a solid electrolyte layer located between the cathode member and the anode member, wherein at least one of an inner surface of the bottom of the exterior can and an inner surface of the flat portion of the seal can includes a recess-protrusion structure, the battery includes a conductive sheet located between the at least one inner surface including the recess-protrusion structure and the power generation element, the conductive sheet having an ability to recover against a pressing force, and a rate of recovery of the conductive sheet against a pressing force is not lower than 7%.

2. The all-solid-state battery according to claim 1, wherein the conductive sheet is a graphite sheet.

3. The all-solid-state battery according to claim 2, wherein the graphite sheet has an apparent density of 0.3 to 1.5 g/cm$^3$.

4. The all-solid-state battery according to claim 2, wherein the graphite sheet is a porous sheet formed from expanded graphite resulting from expansion caused by foaming.

5. The all-solid-state battery according to claim 1, wherein the conductive sheet has a thickness of 0.05 to 0.5 mm.

6. The all-solid-state battery according to claim 1, wherein no separator is provided between the cathode member and the anode member.

* * * * *